Figure 1:
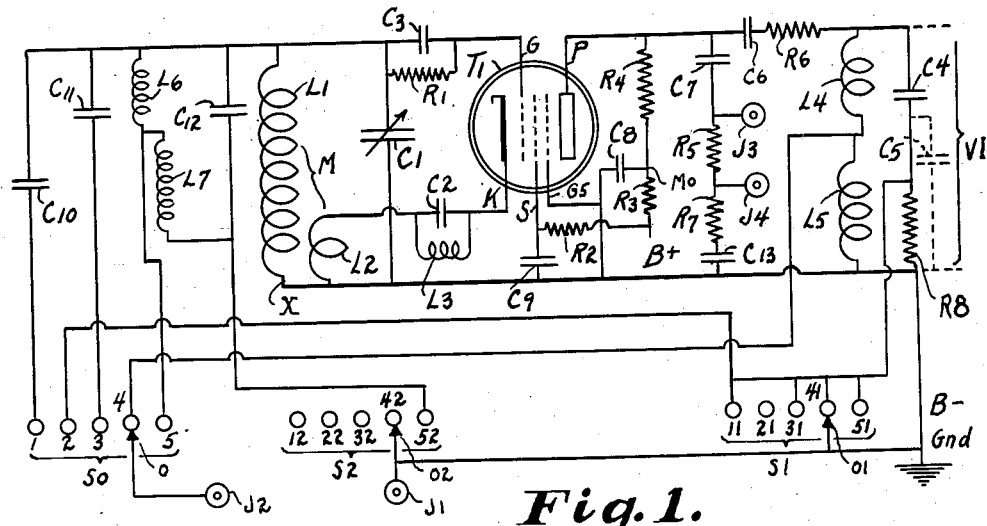

May 24, 1949.　　　P. H. GREELEY　　　2,471,033
RADIO FREQUENCY TESTING DEVICE
Filed March 26, 1946

Inventor
Philip H. Greeley
By Stowell & Evans
Attorney

Patented May 24, 1949

2,471,033

UNITED STATES PATENT OFFICE 2,471,033

RADIO-FREQUENCY TESTING DEVICE

Philip H. Greeley, Washington, D. C.

Application March 26, 1946, Serial No. 657,173

3 Claims. (Cl. 175—183)

This invention relates to radio frequency test apparatus and more particularly to an instrument adapted to purposes of measurement of capacity and inductance values of condensers and coils of types commonly employed in radio apparatus operative at what are commonly known as communication frequencies.

An object of the invention is to provide an instrument of improved operating speed and facility and adapted to direct calibration in terms of capacity and inductance values.

Another object is to provide means for testing condensers and coils while connected in the circuits of apparatus under test with satisfactory indications as to type, condition and approximate value.

A further object is to provide an independent radio frequency operative test device with associated indicating means adapted to show the condition of tuned circuits of common types without disconnection from and independent of the working condition of the apparatus under test.

The invention, with further objects in the direction of providing convenient and useful testing of radio apparatus, will be better understood from the following description and accompanying drawing.

Figure 2:
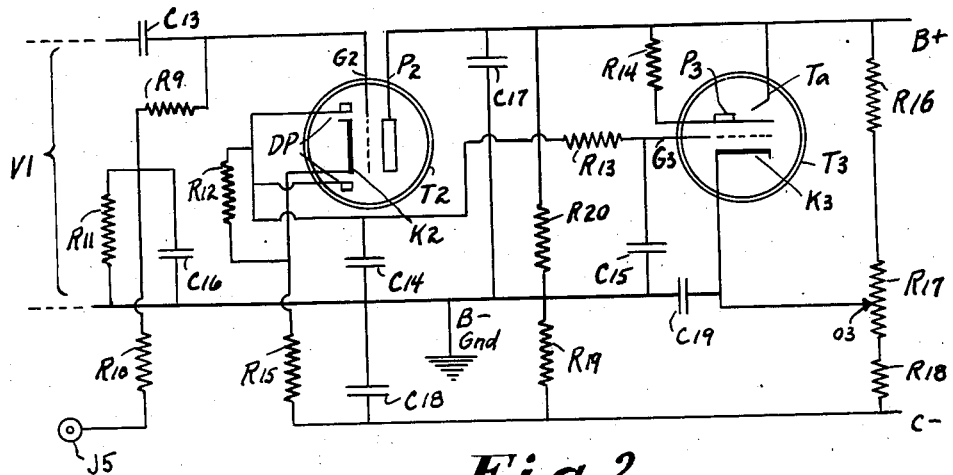

In the drawing,

Fig. 1 is a schematic diagram of a preferred arrangement of the elements providing radio frequency signal generation with coupling, indicator and test circuits, and Fig. 2 is a schematic diagram of a suitable indicator for the tests with this instrument and will normally be a part of the complete test instrument.

With reference to Fig. 1, a radio frequency signal source is provided by an oscillator tube $T_1$ having an associated oscillator circuit including reactance elements $L_1$ and $C_1$, one of which is adjustable and carries a dial suitable for calibration scales. An indicator circuit comprising reactance elements $L_4$ and $C_4$ with such additional circuit elements as may be desirable, as will be described hereinafter in detail, is provided with suitable coupling means, here represented by circuit elements $C_6$ and $R_6$, with the oscillator tube $T_1$. An indicating device, which may be a vacuum tube voltmeter of the type hereinafter described with reference to Fig. 2, is connected across said indicator circuit and is actuated by the voltage VI developed across the indicator circuit.

Now, it will be clear to one skilled in the art that when the oscillator frequency, determined mainly by reactance elements $L_1$ and $C_1$, and the indicator circuit frequency, determined by reactance elements $L_4$ and $C_4$ and associated circuit elements, are the same frequency, the voltage VI actuating the indicating device will be a maximum. For the testing of external reactance elements, coils and condensers, either of two test arrangements are selectively employed. One test arrangement provides connection for an unknown reactance element or circuit at the oscillator circuit $L_1$, $C_1$ and requires adjustment of the oscillator variable reactance element, $C_1$ or $L_1$, to set the oscillator frequency at the frequency of the indicator circuit, in part $L_4$ and $C_4$, which is maintained at a fixed frequency. A second test arrangement provides connection for an unknown reactance element or circuit at the indicator circuit, in part $L_4$ and $C_4$, whose frequency is set within a limited range by the value of said unknown reactance element or circuit, and the oscillator frequency is adjusted by means of the variable reactance element, $C_1$ or $L_1$, to the frequency of said indicator circuit. For both test arrangements, dial scales of the oscillator variable reactance element, $C_1$ or $L_1$, may be calibrated directly, by means of suitable external standards, in capacity and inductance values. By making the oscillator reactance elements, $L_1$ and $C_1$, relatively large as compared with the indicator circuit reactance elements, in part $L_4$ and $C_4$, testing at the oscillator circuit is adapted to the measurement of larger reactance elements, large coils and small condensers, while testing at the indicator circuit is adapted for measurement of smaller reactance elements, small coils and large condensers.

With this outline description of the combination of apparatus forming the basis of this invention and its principles of operation in mind, a specific embodiment of a test instrument incorporating the features of this invention will be described in detail. It will be understood that this invention is not limited to specific design details, since many equivalents are well known in the radio art, nor is this invention limited to a particular number or arrangement of test ranges or a particular range of operating frequencies. However, the many design details and relationships important to good performance of this test instrument can be more readily and clearly explained in connection with a specific design, and, in addition, desirable characteristics in the oscillator itself and the indicating device may be clearly pointed out.

Referring to Fig. 1, the oscillator tube $T_1$ may be a receiving type pentode such as that familiarly known as the 6K7 having a cathode K, a control grid G, an anode grid or screen S, a suppressor grid $G_5$, and a plate P. This tube $T_1$ is operated in an electron coupled circuit wherein tube elements K, G and S are connected in a modified Hartley oscillator circuit comprising a tuning coil $L_1$ and a variable tuning condenser $C_1$ in parallel, a grid coupling condenser $C_3$ and grid resistor $R_1$, a cathode connected feedback coil $L_2$ having a mutual inductance M with coil $L_1$, a cathode series condenser $C_2$ with parallel choke $L_3$, and a screen by-pass condenser $C_9$ with screen current feed resistor $R_2$ connected to a source of high voltage supply B+, the negative end of said high voltage supply B− being connected to ground Gnd and the cathode return of tube $T_1$. For testing purposes, the immediate oscillator should have adequate feedback to maintain oscillation under conditions of loading where tests are applied at the oscillator circuit, and it is desirable to employ an oscillator design providing relatively even voltage output over the frequency range covered by adjustment of the tuning condenser $C_1$. The modified Hartley circuit illustrated in Fig. 1 is adapted to provide even voltage output; condenser $C_2$ is selected to have equal reactance to the self inductive reactance of feedback coil $L_2$ at the highest oscillator frequency and therefore provides an increasing capacitive type reactance of the $L_2$, $C_2$ series circuit at lower oscillator frequencies and thereby aids feedback at said lower oscillator frequencies. Choke $L_3$ carries direct current for the tube cathode K and has sufficient inductive reactance to have little effect on the reactance of condenser $C_2$ at oscillator frequencies.

In the electron coupled oscillator circuit of Fig. 1, the immediate oscillator output is transferred to the plate P of tube $T_1$ with a minimum capacity coupling through grounding of the suppressor grid $G_5$. Plate P is supplied with direct current through resistors $R_4$ and $R_3$ from current supply B+, a by-pass condenser $C_8$ being connected from point Mo to ground. The oscillator plate P output may be used as a signal generator and is made available externally at connections or jacks $J_3$ and $J_4$ through a coupling division circuit comprising condensers $C_7$ and $C_{13}$ with resistors $R_5$ and $R_7$, and audio modulation of signal output may be applied at point Mo.

It is convenient for general test purposes on communication frequencies (about .5 megacycle to 50 megacycles) apparatus to employ an oscillator tuning range of about 160 kc. to 500 kc.; in which case, oscillator tuning condenser $C_1$ may have a maximum capacity of 550 mmf. and a minimum circuit capacity of about 50 mmf. and coil $L_1$ will have an inductance of 1800 microhenries. The indicator circuit of Fig. 1 comprising condenser $C_4$, coil $L_4$ and an additional coil $L_5$ has a tuning range just within the oscillator tuning range: that is, condenser $C_4$ with coils $L_4$ and $L_5$ in series may be resonant at 170 kc., while condenser $C_4$ with coil $L_4$ alone will be resonant at 470 kc. Indicator circuit tuning condenser $C_4$ should preferably have several times the capacity of oscillator tuning condenser $C_1$, and a value of 3000 mmf. may be selected for $C_4$; in which case coil $L_4$ will have an inductance value of 38.3 microhenries and coil $L_5$ in series with coil $L_4$ will have an inductance value of 293 microhenries. It is desirable, for best operation of the indicating device to be described, to make the resonant impedance of the indicator circuit have substantially the same value when tuned to 470 kc. as the value at 170 kc. The resonant impedance of the indicator circuit has a value equal to the product of the capacitive reactance by the circuit Q value, where Q value is the circuit inductive reactance to resistance ratio. Since the capacitive reactance of the fixed value condenser $C_4$ decreases with increase of frequency, the Q value of coil $L_4$ should, by design and construction, be about 2½ times as great as the Q value of coils $L_4$ and $L_5$ in series.

The coupling circuit comprising condenser $C_6$ and resistor $R_6$ couples the plate P of oscillator tube $T_1$ to the indicator circuit $C_4$, $L_4$ and $L_5$. The values of condenser $C_6$ and resistor $R_6$ are readily selected experimentally; condenser $C_6$ may have a value of about 20 mmf. and resistor $R_6$ may be of the order of 50,000 ohms. A definite voltage VI developed across the indicator circuit is desirable and may be from 5 to 10 volts which is less than the oscillator output voltage by an amount dropped by the impedance of the coupling circuit $C_6$, $R_6$. Further, the coupling circuit impedance should be relatively high to avoid serious loading and broadening of the resonance peak of the indicator circuit.

With an oscillator, an indicator circuit, and a coupling circuit provided having suitable characteristics, and with a suitable operating frequency range selected, attention may be given to connections for external testing, the provision for a plurality of testing ranges and auxiliary test circuit elements, and means for selectively switching from one test range to another.

Connections for external testing are provided at $J_1$ and $J_2$, Fig. 1; $J_1$ and $J_2$ may be conventional pin jacks adapted to receive suitable test lead connectors to apparatus under test. A test range switch is provided and may be a conventional wafer gang switch having 5 positions with three poles or contactors and three sections $S_0$, $S_1$ and $S_2$; section $S_0$ having contactor 0 and contacts or positions 1, 2, 3, 4 and 5; section $S_1$ having contactor 01 and relatively corresponding contacts 11, 21, 31, 41 and 51; and section $S_2$ having contactor 02 and relatively corresponding contacts 12, 22, 32, 42 and 52, only the last being employed on section $S_2$. It will be convenient to refer to switch range positions 1, 2, 3, 4 or 5 with the understanding that the three contactors of switch sections $S_0$, $S_1$ and $S_2$ are moved simultaneously to the corresponding contact positions. Switch contactor 0 connects with jack $J_2$, while switch contactors 01 and 02 are grounded with jack $J_1$. It is further convenient to group switch range positions 1, 3 and 5 together where tests are applied at the oscillator circuit $L_1$, $C_1$ of Fig. 1 and the indicator circuit $C_4$, $L_4$ and $L_5$ is fixed tuned to 170 kc. by contactor 01 grounding condenser $C_4$ on said positions 1, 3 and 5.

On switch position 1, jack $J_2$ is connected through condenser $C_{10}$ of about 400 mmf. to the grid end of oscillator circuit $L_1$, $C_1$. Now, any external condenser connected across jacks $J_2$ and $J_1$ with condenser $C_{10}$ in series forms a capacity value which is placed in parallel with condenser $C_1$ which must be adjusted to set the oscillator circuit frequency at 170 kc., the frequency of the indicator circuit $C_4$, $L_4$ and $L_5$. It will be clear that the external condenser with condenser $C_{10}$ in series simply displaces tuning capacity required in condenser $C_1$ for 170 kc. resonance; and a tuning dial scale carried on condenser $C_1$ may be calibrated directly in terms of capacity by employing a group of standard condensers across jacks $J_2$ and $J_1$ and marking the dial settings for resonance at 170 kc. Condenser $C_{10}$ serves to keep large values of external condensers on the dial scale and thereby provides a quick check for capacity or open in large condensers, though condensers of value larger than 5000 mmf. crowd together at one dial setting and value readings may not be distinguishable. Satisfactory value readings may be from 10 mmf. to 3000 mmf. with best accuracy somewhat within this range.

On switch position 3, jack $J_2$ is connected through a condenser $C_{11}$ of about 150 mmf. to the grid end of oscillator circuit $L_1$, $C_1$ and tests are similar to those of switch position 1, except that condenser $C_{11}$ being smaller than $C_{10}$, the condenser test range employs only about one-half of the dial range and limited inductance values may be read on the balance of the dial scale. It is well known in the art that a condenser and coil in series will test like a condenser of increased capacity so long as the condenser capacitive reactance is greater than coil inductive reactance at the test frequency which here is 170 kc. Test range 3 is intended for no more than approximate calibration but serves to identify an unknown reactance element or circuit as a capacity or an inductance at the test frequency.

On switch position 5, jack $J_2$ is connected to a mid-connection of two coils $L_6$ and $L_7$ which are in series and are paralleled by a condenser $C_{12}$ of about 500 mmf. which has a parallel connection with oscillator circuit $L_1$, $C_1$ closed by contactor 92 of switch section $S_2$ on position 5 and contact 52. Now, if coil $L_6$ has an inductance value to resonate with condenser $C_{12}$ at 170 kc., the test frequency, and coil $L_7$ has four times the inductance value of coil $L_6$, the parallel combination of condenser $C_{12}$ with coils $L_6$ and $L_7$ will have a capacitive reactance effect equivalent to that of about a 400 mmf. condenser in parallel with tuning condenser $C_1$, requiring adjustment of condenser $C_1$ to near minimum capacity for an oscillator frequency of 170 kc. Coil $L_7$ is connected across jacks $J_2$ and $J_1$, and any external coil connected across said jacks $J_2$ and $J_1$ parallels coil $L_7$ and lowers the effective inductance value across coil $L_7$, thereby reducing the equivalent capacity effect of circuit $L_7$, $L_6$ and $C_{12}$ across tuning condenser $C_1$, requiring adjustment of condenser $C_1$ toward larger capacity for an oscillator frequency of 170 kc. By employing a group of standard inductance coils across jacks $J_2$ and $J_1$, a dial scale of condenser $C_1$ may be directly calibrated in inductance values. Range 5 is adapted for reading inductance values from about 30 millihenries to .5 millihenry.

It is convenient to group switch positions 2 and 4 together where tests are applied at the indicator circuit $L_4$, $L_5$, $C_4$ of Fig. 1 and the oscillator circuit is variably tunable by means of the condenser $C_1$.

On switch position 4, which is the switch position illustrated in Fig. 1, jack $J_2$ is connected to the mid-connection of indicator circuit coils $L_4$ and $L_5$ and condenser $C_4$ is grounded. Coil $L_5$, which has an inductance value of 254.7 microhenries and makes with coil $L_4$ of 38.3 microhenries a total indicator circuit inductance value of 293 microhenries tuning said indicator circuit with condenser $C_4$ of 3000 mmf. to a frequency of 170 kc., is connected across jacks $J_2$ and $J_1$. Now, any external coil connected across jacks $J_2$ and $J_1$ reduces the effective inductance value across coil $L_5$ and thereby raises the indicator circuit frequency above 170 kc. and the oscillator circuit tuning condenser $C_1$ must be adjusted to make the oscillator frequency the same as that of the indicator circuit. Again, a dial scale carried on tuning condenser $C_1$ may be calibrated in inductance values by means of standard inductance coil applied across jacks $J_2$ and $J_1$. Since, with any inductance value applied across jacks $J_2$ and $J_1$, the indicator circuit inductance value is never greater than the 293 microhenries provided by coils $L_5$ and $L_4$, and never less than the 38.3 microhenries of coil $L_4$, the indicator circuit frequency range has the limits of 170 kc. and 470 kc. which are within the oscillator tuning range of 160 kc. to 500 kc. Range 4 is adapted for inductance readings from 2 microhenries to 2000 microhenries.

In addition to value readings range 4 provides indications of external coil efficiency or Q value and similarly for circuits which appear as inductance values at the testing frequencies. In general, circuits tuned to a higher frequency appear as inductance values at a relatively low test frequency, the coils of such circuits having an apparent, usually small, increased inductance value by the effect of their tuning condensers. As explained above, the resonant impedance value of the indicator circuit $L_4$, $L_5$ and $C_4$ is equal to the product of the reactance of condenser $C_4$ by the circuit Q value; and a low Q coil or inductance circuit connected in parallel with coil $L_5$ lowers the indicator circuit Q value, the resonant impedance of said indicator circuit and the voltage VI actuating the indicator device. Where voltage VI is, by circuit design, maintained at an even value for tests of normal good coils and circuits, an appreciable drop in the value of voltage VI immediately indicates a coil or circuit of poor Q value or defective condition.

On switch position 2, jack $J_2$ is connected with indicator circuit condenser $C_4$ which is not connected directly to ground by reason of open contact 21 of switch section $S_1$, but condenser $C_4$ is provided with a resistance connection to ground by a resistor $R_3$. If jacks $J_2$ and $J_1$ are short circuited, the indicator circuit comprises coils $L_4$ and $L_5$ with condenser $C_4$ and is resonant at 170 kc.; but if jacks $J_2$ and $J_1$ are open circuited and a condenser $C_5$ of about 455 mmf. is connected across resistor $R_3$, the indicator circuit comprises coils $L_4$ and $L_5$ with condensers $C_4$ and $C_5$ in series and is resonant at 470 kc. But the indicator circuit at 470 kc. resonance has an increased impedance value by reason of the small tuning capacity and increased capacitive reactance of condensers $C_4$ and $C_5$ in series unless the indicator circuit Q value is reduced by a resistance as provided by resistor $R_3$. With condenser $C_5$ in place, the value of resistor $R_3$ is selected experimentally and may be of the order of 10,000 ohms to limit the resonant impedance value of the indicator circuit to a desired substantial equality for all tests. Because of some confusing indications where the indicator circuit is resonant at the high frequency end of the oscillator tuning range, condenser $C_5$ is preferably eliminated after resistor $R_3$ is selected. With the circuits for switch position 2 provided, condensers of value larger than 450 mmf. are connected across jacks $J_2$ and $J_1$, the oscillator circuit frequency adjusted, and a dial scale carried on tuning condenser $C_1$ calibrated directly in condenser values. Range 2 reads condenser values from 450 mmf. to .5 mf. with capacity or open indications on larger condensers together with some showing of Q value of condensers and capacitive type circuits.

Changes in immediate test circuits or the addition of other tests, such as the opening of oscillator coil $L_1$ at point X for the insertion of an external reactance element, may be made if desired. But practically important purposes of test circuit designs are to provide an adequate range and type of tests together with an ability to operate usefully on whole circuits or circuit elements under test without need for disconnecting said whole circuits or circuit elements from their associated apparatus. The testing of whole circuits or circuit elements without apparatus disconnections is believed to be a novel idea in the radio art, but is thoroughly practical and convenient with an instrument embodying the features of this invention. In such testing, it will be observed that the lowest value reactance element or circuit (connected across jacks $J_2$ and $J_1$) with regard to the test frequency range has a major effect on the test reading; and, in many cases, particularly with by-pass condensers under test, the part under test has its value so little affected by connected circuit elements that accurate and satisfactory readings may be made without circuit disconnections. The speed and convenience of such testing will be apparent to one skilled in the art. It is further to be noted that the efficiency or Q value of a part or circuit may be checked, mainly on test positions 4 and 2, and defective parts quickly noted by relatively low voltage readings VI at the indicator circuit. Intermittent or defective connections in a part or circuit will be quickly apparent in changing voltage readings VI at the indicator circuit.

In order to best meet the requirements for reading the voltage VI developed across the indicator circuit $L_4$, $L_5$ and $C_4$ of Fig. 1 in view of the testing provided in this invention, a novel and particularly suitable voltmeter indicator is provided and is represented schematically in Fig. 2. Such a voltmeter indicator is preferably made part of a unitary instrument incorporating the testing circuits hereinbefore described in order to readily minimize variable factors at the indicator circuit. Other desirable indicator characteristics, such as a relatively quick action for best showing of intermittent faults together with internal action on alternating currents with external operation on direct current, are best provided in a special construction of a voltmeter indicator.

With reference to Fig. 2, a diode-triode amplifier tube $T_2$, such as the type commonly known as the 6Q7, is employed in a cathode follower type of voltmeter circuit with a cathode ray tuning indicator tube $T_3$, such as the type known as the 6E5. The circuits for tubes $T_2$ and $T_3$ comprise resistors and condensers; resistors $R_9$, $R_{10}$, $R_{11}$, $R_{12}$, $R_{13}$ and $R_{14}$ being of high value of the order of a megohm or more, while resistors $R_{15}$, $R_{16}$, $R_{17}$, $R_{18}$, $R_{19}$ and $R_{20}$ are of relatively low value of the order of 50,000 ohms or less; condensers $C_{13}$, $C_{14}$, $C_{15}$ and $C_{16}$ are preferably mica types of .005 mf. or lower value, while condensers $C_{17}$, $C_{18}$ and $C_{19}$ are suitable larger value types serving familiar by-pass and filter purposes. The circuits of Figs. 1 and 2 have a common ground connection and may employ a common source of plate current supply which is divided by resistors $R_{19}$ and $R_{20}$ with tube conduction effects; the direct current voltage across resistor $R_{20}$ from B+ to B— being, for convenience, 200 volts and the voltage across resistor $R_{19}$ from B— to C— being 40 volts. The plate $P_2$ of tube $T_2$ and the target $T_a$ of tube $T_3$ are connected to B+ and plate $P_3$ of tube $T_3$ is connected through series resistor $R_{14}$ to B+. The voltage VI developed across the indicator circuit $L_4$, $L_5$ and $C_4$ of Fig. 1 appears by direct connection as voltage VI of Fig. 2 with coupling to the grid $G_2$ of tube $T_2$ by means of a coupling condenser $C_{13}$.

Further description of the voltmeter indicator of Fig. 2 is most readily made with regard to operating voltage conditions with the ground and B— voltage considered as zero voltage level. The grid $G_2$ of tube $T_2$ is connected to ground and zero voltage level through high value resistors $R_9$ and $R_{11}$, while the cathode $K_2$ of tube $T_2$ is connected to the C— or negative 40 volt level through cathode resistor $R_{15}$ which may have a value of 50,000 ohms. The current between plate $P_2$ and cathode $K_2$ of tube $T_2$, which may have a normal value of 800 microamperes, flows in cathode resistor $R_{15}$ and develops an IR voltage across resistor $R_{15}$ of about 40 volts which makes the voltage level of cathode $K_2$ very near or slightly positive with respect to the voltage level of grid $G_2$, and no appreciable grid current flows in resistors $R_9$ and $R_{11}$. The diode plates DP of tube $T_2$ are connected together, are connected through high resistance $R_{12}$ of about 2 megohms to cathode $K_2$, are by-passed to ground by condenser $C_{14}$, and are connected to grid $G_3$ of tube $T_3$ by a resistor $R_{13}$ of about 5 megohms. Cathode $K_3$ of tube $T_3$ is connected to a contactor 03 of a variable resistor or potentiometer $R_{17}$ operative by an instrument panel control; potentiometer $R_{17}$ with resistors $R_{16}$ and $R_{18}$ form a voltage divider adapted to permit the voltage level of contactor 03 and tube cathode $K_3$ to be set at or up to some 30 volts positive or negative from the ground and B— zero voltage level.

When an A. C. voltage VI is applied at the grid $G_2$ of tube $T_2$ through condenser $C_{13}$, the cathode $K_2$ follows the applied grid voltage and the cathode A. C. voltage is rectified half wave by diode plates DP by-passed to ground by condenser $C_{14}$, thereby developing a negative voltage across resistor $R_{12}$ which negative voltage is applied to the grid $G_3$ of tube $T_3$. The cathode ray indicator tube $T_3$ shows a shadow angle of 90 degrees when its cathode $K_3$ and grid $G_3$ are at the same potential, and may show a shadow angle of zero degrees when the grid $G_3$ is about 7 volts negative with respect to the potential of the cathode $K_3$. The exact potential of cathode $K_3$ is readily set by adjustment of contactor 03 of potentiometer $R_{17}$ for best operation of cathode ray indicator tube $T_3$ with respect to the cathode potential of tube $T_2$ and the negative rectified voltage appearing at grid $G_3$ of tube $T_3$.

Particular advantages of the voltmeter indicator of Fig. 2 for the test purposes hereinbefore described are: the relatively small loading of the indicator circuit $L_4$, $L_5$ and $C_5$ of Fig. 1 provided by the cathode follower circuit of tube $T_2$, Fig. 2, with rectifier loading at the relatively low impedance cathode circuit rather than the input circuit; easy control of the response speed of the cathode ray indicator tube $T_3$ for best showing of intermittents where response speed is dependent upon values of resistors $R_{13}$ and $R_{12}$ with values of condensers $C_{15}$ and $C_{14}$ which may be selected to provide desirable circuit time constants as is well known in the art; and a sensitivity range of the cathode ray tube $T_3$ which is readily shifted up or down for initial and best test operation by means of cathode $K_3$ potentiometer $R_{17}$. Tube $T_3$ may be operated as a delay voltage indicator; that is, if tube $T_3$ has a sensitivity voltage range of 7 volts applied between grid $G_3$ and cathode $K_3$ and the rectified voltage available from tube $T_2$ is about 10 volts, the cathode $K_3$ voltage level of tube $T_3$ may be set by potentiometer $R_{17}$ for no change in shadow angle of indicator tube $T_3$ on the first 3 volts of the 10 volts available from tube $T_2$. The resonance-frequency curve of a parallel tuned circuit such as indicator circuit $L_4$, $L_5$ and $C_5$ of Fig. 1, as is well known, has a somewhat broad base rising to a narrow and relatively sharp peak.

Cutting off indications of the broad base of the tuned circuit curve by voltage delay action in tube T3 of Fig. 2 improves the clarity and definiteness of resonance indications on tests provided by the apparatus of Fig. 1.

A further advantage of the voltmeter indicator circuit of Fig. 2 is the ease and simplicity of providing external operation on D. C. voltages without alteration of internal connections for operation on the A. C. voltage VI. By means of a connection or jack J5, an external D. C. voltage may be applied through a resistor R10 in series with resistor R9 to the grid G2 of tube T2, a suitable ground connection being available as at jack J1 of Fig. 1. A change in the voltage level of grid G2 of tube T2, Fig. 2, changes the voltage level of cathode K2 and, through connected resistor R13, the voltage level of grid G3 of tube T3 with change in the shadow angle of indicator tube T3 whose cathode K3 is adjusted to a suitable voltage level by potentiometer R17. By voltage division between resistors R10 and R11 and the voltage level indication range provided by potentiometer R17, the external voltage range across jack J5 and ground may be provided as desired by the selection of the value of resistor R10. Condenser C16 with resistor R10 serves as a capacity and resistance filter circuit. The voltmeter-indicator of Fig. 2 may be used externally for such purposes as alignment adjustment of radio receivers simultaneously with the oscillator of Fig. 1 as a signal generator where the A. C. voltage VI of Fig. 1 is kept negligibly small by leaving jacks J2 on open circuit and setting the selector switch S0, S1 and S2 on the range 2 position.

Primary requisites in a test instrument for radio service and circuit work are operating speed and convenience together with an adequate range of testing performance. Although instruments known in the radio art may conceivably be used with auxiliary apparatus for some of the useful tests as herein provided, new and useful improvements in the direction of increasing operating speed and convenience with selective change to any one of a plurality of test ranges and design adaptability to direct calibration of value readings are provided by employing the features of this invention. For practical usefulness in the field of testing tuned radio circuits and circuit elements, a combination of apparatus capable of operating as a unit and employing unit construction of apparatus for the oscillator, indicator circuit, coupling circuit, selection and auxiliary test circuit means is required and set forth in the description of this invention. The design herein shown and adapted for unit construction with a plurality of selective test ranges provides a new and useful combination having improved and extended testing performance.

I claim:

1. Apparatus for testing electric reactance elements comprising, in combination, an oscillating current generator having voltage output terminals, means for tuning said generator over a predetermined frequency range, and indicator means responsive to the setting of said generator tuning means including a scale calibrated in terms of electric reactance element values; a resonant circuit having inductive and capacitive branches of preselected element value; voltage coupling means including a series coupled resistor connecting said resonant circuit for parallel resonance to the output terminals of said oscillating current generator; a voltage indicating device coupled with said parallel resonant circuit for indicating voltage developed thereacross; and means including fixed test terminals and a switch for selectively connecting an unknown reactance element in at least one of the branches of said resonant circuit.

2. Apparatus for testing electric reactance elements comprising, in combination, an oscillating current generator having voltage output terminals, means for tuning said generator over a predetermined frequency range, and indicator means responsive to the setting of said generator tuning means including a scale calibrated in terms of electric reactance element values; a resonant circuit having inductive and capacitive branches of preselected element values, said inductive branch comprising a pair of inductors of unequal value connected in series; voltage coupling means including a series coupled resistor connecting said resonant circuit for parallel resonance to the output terminals of said oscillating current generator; a voltage indicating device coupled with said parallel resonant circuit for indicating voltage developed thereacross; and means including fixed test terminals and a switch for selectively connecting an unknown reactance element across the larger inductor in the inductive branch of said resonant circuit.

3. Apparatus for testing electric reactance elements comprising, in combination, an oscillating current generator having voltage output terminals, means for tuning said generator over a predetermined frequency range, and indicator means responsive to the setting of said generator tuning means including a scale calibrated in terms of electric reactance element values; a resonant circuit having inductive and capacitive branches of preselected element values, said inductive branch comprising a pair of inductors of unequal inductance value and inversely related relative "Q" values connected in series; voltage coupling means including a series coupled resistor connecting said resonant circuit for parallel resonance to the output terminals of said oscillating current generator; a voltage indicating device coupled with said parallel resonant circuit for indicating voltage developed thereacross; and means including fixed test terminals and a switch for selectively connecting an unknown reactance element across the inductor of larger inductance value in the inductive branch of said resonant circuit.

PHILIP H. GREELEY.

REFERENCES CITED

The following references are of record in the file of this patent:

UNITED STATES PATENTS

| Number | Name | Date |
| --- | --- | --- |
| 1,971,310 | Barber | Aug. 21, 1934 |
| 2,111,235 | Avins | Mar. 15, 1938 |
| 2,135,017 | Sharland | Nov. 1, 1938 |
| 2,137,787 | Snow | Nov. 22, 1938 |
| 2,146,073 | Jennens et al. | Feb. 7, 1939 |
| 2,309,934 | Clay | Feb. 2, 1943 |
| 2,337,759 | Loughlin | Dec. 28, 1943 |
| 2,358,391 | Ford | Sept. 19, 1944 |
| 2,364,687 | Banker | Dec. 12, 1944 |

OTHER REFERENCES

Blackwell et al., Wireless World, Feb. 1944, pages 37–40.

Radio World, July 1936, pages 45–51.